United States Patent
Aviles et al.

(10) Patent No.: US 9,426,247 B2
(45) Date of Patent: Aug. 23, 2016

(54) SYSTEM AND METHOD FOR POPULATING A CACHE USING BEHAVIORAL ADAPTIVE POLICIES

(71) Applicant: NetApp, Inc., Sunnyvale, CA (US)

(72) Inventors: Joaquin J. Aviles, Austin, TX (US); Mark U. Cree, Austin, TX (US); Gregory A. Dahl, Austin, TX (US)

(73) Assignee: NetApp, Inc., Sunnyvale, CA (US)

( * ) Notice: Subject to any disclaimer, the term of this patent is extended or adjusted under 35 U.S.C. 154(b) by 97 days.

(21) Appl. No.: 14/312,278

(22) Filed: Jun. 23, 2014

(65) Prior Publication Data

US 2014/0310373 A1 Oct. 16, 2014

Related U.S. Application Data

(63) Continuation of application No. 12/015,250, filed on Jan. 16, 2008, now Pat. No. 8,805,949.

(51) Int. Cl.
*G06F 15/16* (2006.01)
*H04L 29/08* (2006.01)
*H04L 12/24* (2006.01)

(52) U.S. Cl.
CPC ....... *H04L 67/2842* (2013.01); *H04L 41/0893* (2013.01); *H04L 67/1002* (2013.01); *H04L 67/1014* (2013.01); *H04L 67/1025* (2013.01); *H04L 67/2819* (2013.01); *H04L 67/2852* (2013.01); *H04L 41/08* (2013.01)

(58) Field of Classification Search
CPC .................................................. H04L 67/2842
USPC ........................................................ 709/213
See application file for complete search history.

(56) References Cited

U.S. PATENT DOCUMENTS

| | | | |
|---|---|---|---|
| 6,721,875 B1 | 4/2004 | McCormick et al. | |
| 6,751,583 B1 | 6/2004 | Clarke et al. | |
| 6,976,090 B2 | 12/2005 | Ben-Shaul et al. | |
| 7,043,606 B2 | 5/2006 | Roskind | |
| 7,080,128 B2 | 7/2006 | Sakaguchi | |
| 7,143,438 B1 | 11/2006 | Coss et al. | |
| 7,191,290 B1 | 3/2007 | Ackaouy et al. | |
| 7,203,754 B2 | 4/2007 | Bai et al. | |
| 7,330,908 B2 * | 2/2008 | Jungck | H04L 29/12066 370/236.1 |
| 7,356,651 B2 | 4/2008 | Liu et al. | |
| 7,398,356 B2 | 7/2008 | Tran et al. | |
| 7,409,433 B2 | 8/2008 | Lowery et al. | |
| 7,454,564 B2 | 11/2008 | Roskind | |
| 7,502,877 B2 | 3/2009 | Huggahalli et al. | |

(Continued)

OTHER PUBLICATIONS

Shepler, S. et al. "Network File System (NFS) Version 4 Minor Version 1 Protocol," RFC 5661, Jan. 2010. 674 pages.

(Continued)

*Primary Examiner* — Melvin H Pollack
(74) *Attorney, Agent, or Firm* — Nixon Peabody LLP; Khaled Shami

(57) ABSTRACT

A method, system and program are disclosed for accelerating data storage in a cache appliance cluster that transparently monitors NFS and CIFS traffic between clients and NAS subsystems and caches files using dynamically adjustable cache policies which populate the storage cache using behavioral adaptive policies that are based on analysis of clients-filers transaction patterns and network utilization, thereby improving access time to the data stored on the disk-based NAS filer (group) for predetermined applications.

20 Claims, 7 Drawing Sheets

(56) References Cited

U.S. PATENT DOCUMENTS

| | | |
|---|---|---|
| 7,519,677 B2 | 4/2009 | Lowery et al. |
| 7,565,450 B2 | 7/2009 | Garcia-Luna-Aceves et al. |
| 7,584,285 B2 | 9/2009 | Hudson et al. |
| 7,587,515 B2 | 9/2009 | Agarwalla et al. |
| 7,596,591 B2 | 9/2009 | Titmuss |
| 7,602,774 B1 | 10/2009 | Sundaresan et al. |
| 7,610,400 B2 | 10/2009 | L'Heureux et al. |
| 7,624,047 B1 | 11/2009 | Round |
| 7,627,779 B2 | 12/2009 | Fair |
| 7,643,480 B2 | 1/2010 | Liu et al. |
| 7,676,601 B2 | 3/2010 | Smith et al. |
| 7,730,154 B2 | 6/2010 | Agarwalla et al. |
| 7,733,878 B2 | 6/2010 | Knight et al. |
| 7,747,993 B2 | 6/2010 | Onder |
| 7,805,710 B2 | 9/2010 | North |
| 7,823,186 B2 | 10/2010 | Pouliot |
| 7,831,772 B2 | 11/2010 | Nalawade et al. |
| 7,856,530 B1 | 12/2010 | Mu |
| 7,908,337 B2 | 3/2011 | Garcia-Luna-Aceves et al. |
| 7,912,921 B2 | 3/2011 | O'Rourke et al. |
| 7,934,054 B1 | 4/2011 | Moll et al. |
| 7,966,321 B2 | 6/2011 | Wolosin et al. |
| 7,987,239 B2 | 7/2011 | Agarwalla et al. |
| 7,991,959 B2 | 8/2011 | Sohm et al. |
| 7,991,960 B2 | 8/2011 | Croxford et al. |
| 8,006,111 B1 | 8/2011 | Faibish et al. |
| 8,032,586 B2 | 10/2011 | Challenger et al. |
| 8,059,737 B2 | 11/2011 | Yang |
| 8,561,116 B2 | 10/2013 | Hasek |
| 2004/0073898 A1 | 4/2004 | Pande et al. |
| 2004/0205208 A1 | 10/2004 | Koponen et al. |
| 2007/0055555 A1 | 3/2007 | Baggett et al. |
| 2007/0150538 A1 | 6/2007 | Fujibayashi |
| 2007/0204267 A1 | 8/2007 | Cole et al. |
| 2007/0244987 A1 | 10/2007 | Pedersen et al. |
| 2008/0010410 A1 | 1/2008 | Zilbershtein et al. |
| 2008/0028147 A1 | 1/2008 | Jacobson et al. |
| 2008/0034110 A1 | 2/2008 | Suganthi et al. |
| 2009/0049237 A1 | 2/2009 | Sivakumar et al. |
| 2009/0070533 A1* | 3/2009 | Elazary .................. G06F 12/12 711/133 |
| 2009/0177732 A1 | 7/2009 | Martin et al. |
| 2009/0182835 A1 | 7/2009 | Aviles et al. |
| 2009/0182945 A1 | 7/2009 | Aviles et al. |
| 2010/0017600 A1 | 1/2010 | Lepeska et al. |
| 2010/0077251 A1* | 3/2010 | Liu ....................... H04L 1/0002 714/4.1 |
| 2010/0214313 A1 | 8/2010 | Herman et al. |
| 2011/0218951 A1 | 9/2011 | Kline et al. |

OTHER PUBLICATIONS

Rajagopal, Metal. "Fibre Channel over TCP/IP (FCIP)," RFC 3821, Jul. 2004. 74 pages.

Vixie, P and Wessels, D. "Hyper Text Caching Protocol (HTCP/0.0)," RFC 2756, Jan. 2000. 15 pages.

Qureshi, Moinuddin et al. "Adaptive Insertion Policies for High Performance Caching," Proceedings of the 34th Annual International Symposium on Computer Architecture, vol. 35, Issue 2, May 2007. 11 pages.

Bent, John et al. "Explicit Control in a Batch-Aware Distributed File System," First USENIX Symposium on Networked Systems Design and Implementation (NSDI), 2004. 14 pages.

Guitart, J. et al. "Session Based Adaptive Overload Control for Secure Dynamic Web Applications," International Conference on Parallel Processing (ICPP), Jun. 2005, pp. 341-349. 9 pages.

R. Harris, Big Network Storage Cache From Gear6, Enterprise, NAS, IP, iSCSI, Oct. 17, 2006. http://storagemojo.com/2006/10/17/big-network-storage-cache-from-gear6/. 2 pages.

C. Mellor, Techworld, Gear6 Offers Huge RAM Cache for Network, Aug. 28, 2007 http://edge.networkworld.com/news/2007/082807-gear6-offers-huge-ram-cache.html. 1 page.

B. O'Neill, Performance Caching: Your New Tier-0, Oct. 11, 2006 http://searchstorage.techtarget.com/columnItem/0,294698,sid5_gci1222955,00.html. 3 pages.

Gear6, Cachefx Datasheet, 2007. 2 pages.

Gear6, Reflex OS Datasheet, 2007. 2 pages.

Gear6, Solving Rendering Bottlenecks in Computer Animation, 2007. 8 pages.

Ocarina Networks, Data Footprint Reduction, 2007. 1 page.

Taneja Group, The Business Case for Centralized Storage Caching, Technology Brief, Dec. 2006. 7 pages.

Farsighted, The Analyst's Corner: The Ultimate Performance Gap—Farsighted Speaks with David Freund, http://farsightednews.org/snia/jun06_ts_analystscorner.html, Jun. 2006. 2 pages.

Wikipedia, File Area Networking, printed Sep. 20, 2007. 8 pgs.

* cited by examiner

SYSTEM AND METHOD FOR POPULATING A CACHE USING BEHAVIORAL ADAPTIVE POLICIES

RELATED APPLICATION

This application is a Continuation of U.S. patent application Ser. No. 12/015,250, entitled "SYSTEM AND METHOD FOR POPULATING A CACHE USING BEHAVIORAL ADAPTIVE POLICIES", filed Jan. 16, 2008; the aforementioned priority application being hereby incorporated by reference in its entirety for all purposes.

FIELD OF THE INVENTION

The present invention is directed in general to the field of computer storage networks. In one aspect, the present invention relates to a standalone cache memory device which is connected between one or more host machines and a storage device.

DESCRIPTION OF THE RELATED ART

Data storage technology over the years has evolved from a direct attached storage model (DAS) to using remote computer storage models, such as Network Attached Storage (NAS) and a Storage Area Network (SAN). With the direct storage model, the storage is directly attached to the workstations and application servers, but this creates numerous difficulties with the administration, backup, compliance and maintenance of the directly stored data. These difficulties are alleviated at least in part by separating the application server/workstations from the storage medium. For example, FIG. 1 depicts a typical NAS system 100 in which a number of PCs, workstations and application servers (clients) use a network 10 to access storage resources on a number of remote network attached storage and file servers (or filers). In the depicted system 100, each of the networked PC or workstation devices 12-14 and application servers 16-18 may act as a storage client that is connected to the network 10 by the appropriate routers 11 and switches 15 to remotely store and retrieve data with one or more NAS filers 1-6, which in turn are connected to the network 10 by the appropriate routers 9 and switches 7-8. Typically, the storage clients (e.g., 14) use an IP-based network protocol, such as CIFS and NFS, to communicate store, retrieve and modify files on an NAS filer (e.g., 5).

Conventional NAS devices are designed with data storage hardware components (including a plurality of hard disk drives, one or more processors for controlling access to the disk drives, I/O controller and high speed cache memory) and operating system and other software that provides data storage and access functions. Even with a high speed internal cache memory, the access response time for NAS devices continues to be outpaced by the faster processor speeds in the client devices 12-14, 16-18, especially where any one NAS device may be connected to a plurality of client storage devices. In part, this performance problem is caused by the lower cache hit rates that result from a combination of increased disk capacity and high-density mounting on the NAS storage device.

While a number of solutions have been proposed to address these problems, they are, for a variety of reasons, not entirely satisfactory. For example, increases in the size and speed of the cache memory result in increased costs. And while faster disk drives have been developed, the increased disk drive access speeds are not enough to overcome the performance gap. Other solutions have proposed using performance-oriented data placement, but these have provided only limited performance gains. Attempts to increase response speed by using disk striping across multiple RAID disks have not proven to be scalable or have otherwise suffered from proprietary limitations. And while parallel file systems with virtualization have been able to provide short-term performance gains, they are massively complex and difficult to implement. Accordingly, there is a need for a system and method for improving the disk storage access time to overcome the problems in the art, such as outlined above. Further limitations and disadvantages of conventional solutions will become apparent to one of skill in the art after reviewing the remainder of the present application with reference to the drawings and detailed description which follow.

SUMMARY OF THE INVENTION

A high-performance, scalable, stand-alone intelligent cache appliance and methodology are provided for dynamically caching files by monitoring NFS and CIFS traffic between clients and NAS subsystems in response to clients that make read and write requests for these files. When positioned between the storage clients and the NAS filers, the intelligent cache appliance intercepts all requests between the clients and filers and provides read and write cache acceleration by storing and recalling frequently used information. By snooping network protocol traffic state parameters and splicing connections between filers and clients, the intelligent cache appliance provides Open System Interconnect (OSI) transparency, thereby performing in the Ethernet network as a bump-in-the-wire. In selected embodiments, a plurality of intelligent cache appliances may be clustered together to seamlessly scale the cache capacity by allowing devices to become part of a cohesive memory pool without user intervention, either by using a daisy-chain configuration to connect up to three cache appliances or by using a switched configuration to connect four or more cache appliances. In other embodiments, an initial or default cache population algorithm may be adaptively adjusted or modified. Such modifications occur automatically upon discovery of adjacent storage and networking equipment, learned traffic patterns and/or identified data usage. In addition or in the alternative, the modifications to the cache population algorithm can be managed, optimized and automated by the user based on analysis of transaction patterns between clients and filers and/or based on network utilization.

In accordance with various embodiments, a data operation (such as a request to read or write a file from a networked storage device) may be adaptively cached or serviced by a non-disruptive storage cache which uses packet inspection intelligence to splice connections under software control using the methodologies and/or apparatuses described herein, which may be implemented in a standalone cache appliance with computer program code comprising computer executable instructions. In whatever form implemented, a standalone cache unit receives a request from a remote client to perform a specified data operation at one or more networked data storage devices. The standalone cache unit inspects packet parameters in each TCP/IP stack layer associated with the request and determines if the request can be serviced by a cache memory located at the standalone cache unit. If the request can be serviced by the cache memory, the specified data operation is performed by the standalone cache unit. In operation, the cache memory is populated with a default cache engine policy which may be modified with a user-specified cache profile for selectively adjusting the default cache engine policy in accordance with business requirements of the user. In selected embodiments, the default cache engine policy comprises a least recently used with dual time reference algorithm aided with greedy dual size frequency algorithm, and the user-specified cache profile provides preferential access to the cache memory for files from a user-specified application data set. In other embodiments, the user-specified cache profile provides preferential access to the cache memory for files from a user-specified application data set in accordance with a predetermined schedule. In yet other embodiments, the user-specified cache profile provides preferential access to the cache memory for files from a client located at a predetermined IP address. The user-specified cache profile may also modify the default cache engine policy to provide preferential access to the cache memory for files from a predetermined location in a specified networked data storage device, or to provide preferential access to the cache memory for a predetermined set of files that are identified by one or more file path components, such as NAS subsystem, filer, volume, path, directory, name, extension and size. In yet other embodiments, the user-specified cache profile provides preferential access to the cache memory for one or more specified remote clients using one or more predetermined schedules that specify when each remote client has preferential access.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
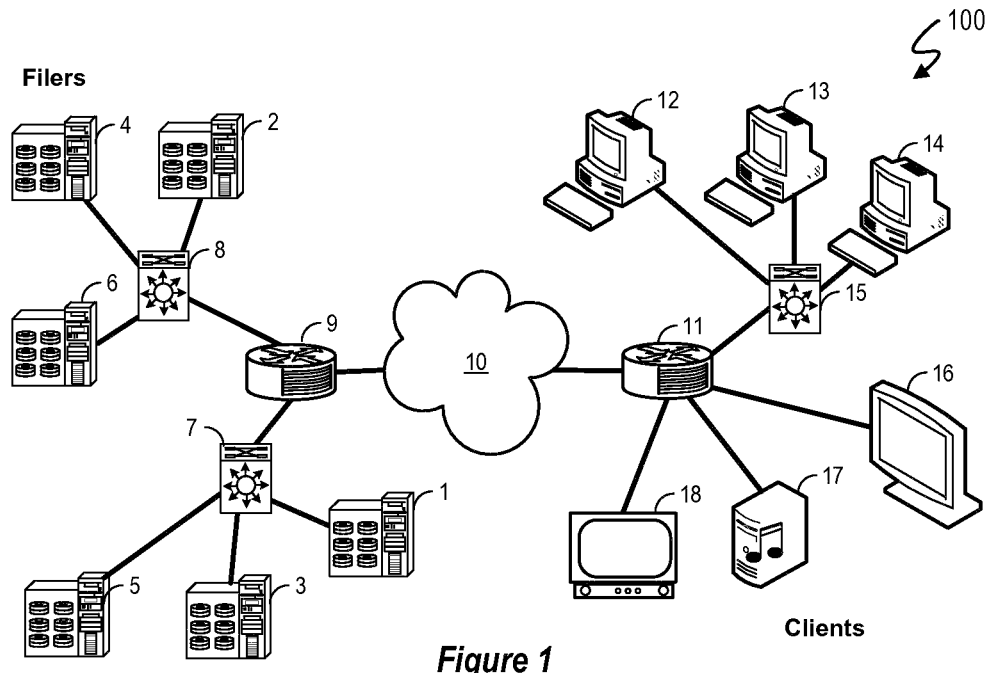
FIG. 1 depicts a typical NAS system in which client devices use a network to access storage resources on a number of remote network attached storage and file servers.

A method, system and program are disclosed for accelerating data storage access by adaptively caching selected data in a scalable, stand-alone cluster of high-performance memory-based devices that transparently monitors NFS and CIFS traffic between clients and NAS subsystems and caches files using dynamically adjustable cache policies that reflect the business requirements and/or application workloads that change over time. In selected embodiments, one or more cache appliances may be connected or clustered together in front of an NAS filer (group) to provide low-latency access and redundancy in responding to both read and write requests for cached files, thereby improving access time to the data stored on the disk-based NAS filer (group). When a plurality of cache appliances are clustered together, the cache capacity may be seamlessly scaled by allowing devices to become part of a cohesive memory pool without user intervention, either by using a daisy-chain configuration to connect up to three cache appliances or by using a switched configuration to connect four or more cache appliances. By providing adjustable caching policies, the clustered cache appliances may be populated to reflect business requirements, to implement content matching algorithms and/or to reflect time-varying file access patterns, network utilization, file sizes and client load. The adjustable caching policies may be defined by the user as application profiles that identify application data sets and create policies that automate the management of those data sets in order to influence what files are to be cached and when. For example, application profiles may be used to identify a set of files that, when served from the cache appliance cluster, will increase the overall performance of the application by reducing or eliminating I/O bottlenecks. Application profiles may also be used to give higher caching priority to selected application data sets that have a positive impact on business, while giving lower caching priority to other application data sets. In addition, application profiles may be used to determine schedules for caching data sets from predetermined applications and/or to identify application clients whose application data sets are to be cached.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
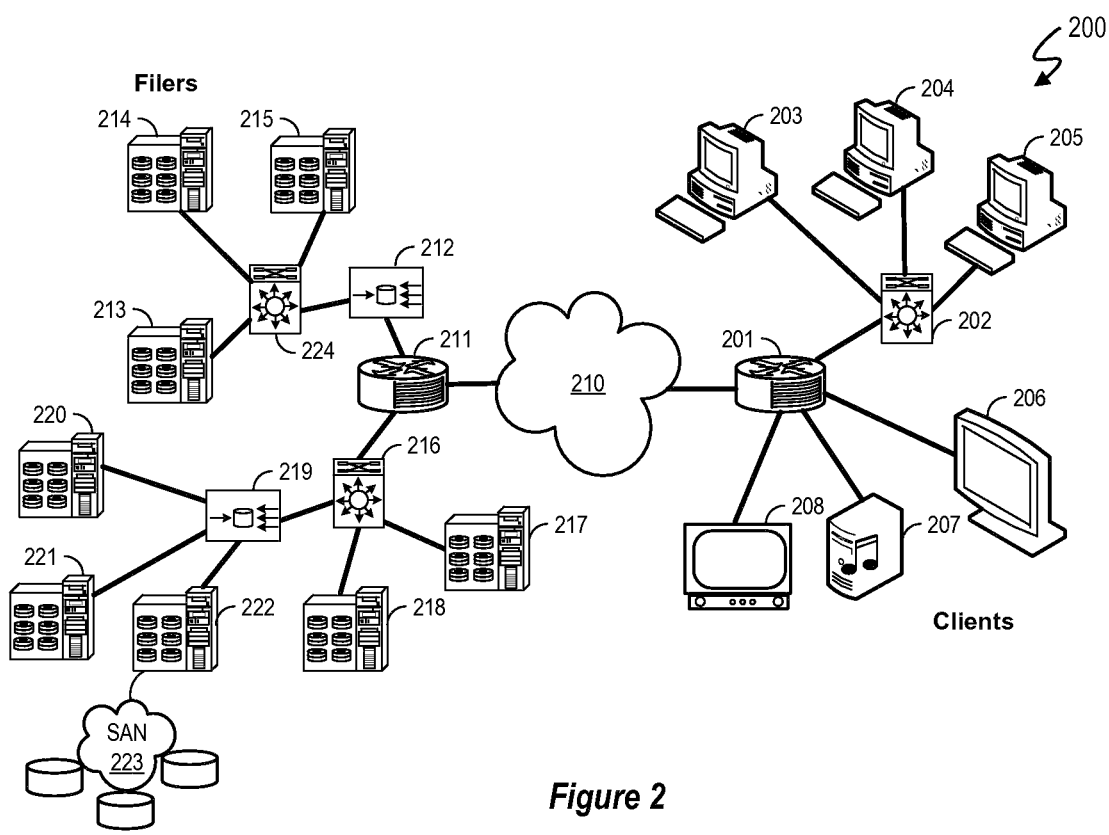
FIG. 2 depicts an enterprise storage network system in which one or more intelligent cache appliances may be located in front of a file server or a plurality of file servers.

Referring to FIG. 2, a diagram depicts an example enterprise storage network system 200 in which one or more intelligent cache appliances (e.g., 212, 219) may be located in front of a file server (e.g., 222) or a file server group (e.g., 213-215). The depicted storage network system 200 includes one or more storage clients, such as mobile or desktop PCs or workstations 203-205 or application servers 206-208. Each of the storage clients may run a separate application which requires access to remotely-stored application data. When the application data is stored in one of the NAS filers, the storage client sends a read or write request over the network 210 using the appropriate routers 201, 211 and/or switches 202, 216, 224. Such requests may be sent to the destination NAS filer using an appropriate IP-based network protocol, such as CIFS or NFS. However, when an intelligent cache appliance is installed in-line between the storage clients and a destination NAS filer, the request to read or write application data may be processed more quickly from the cache appliance's memory than would otherwise occur if the application data were processed from the disk arrays or cache memory in the NAS filer. In this description, a reference to a cache appliance (e.g., 212) may include one or more cache appliances that are connected or clustered together and working in tandem to form a single homogeneous caching device, as described more fully below. In addition, it will be appreciated that each cache appliance may be constructed as a high-speed packet processor with a substantial cache memory by including a set of network processing resources (such as a network switch and network processor(s)), a dynamic cache memory, a non-volatile cache memory and cache controller(s).

As indicated in FIG. 2, the intelligent cache appliances may be installed in a variety of different locations in the enterprise storage network 200 to provide the adaptive caching benefits to a one or more NAS filers (as shown by the placement of the cache appliance 219 in relation to NAS filers 220-222) or to a group of NAS filers (as shown by the placement of the cache appliance 212 in relation to the switched NAS filers 213-215). However positioned, the cache appliance operates to intercept all requests between the storage clients and the filers fronted by the cache appliance and provide read and write cache acceleration by storing and recalling frequently used information. Obviously, for this to occur, the cache appliance must be the only path that is able to reach the filers from the clients, and if any other path is available, cache coherency problems arise when a piece of information stored on the cluster is modified through an alternate path.

When provided with packet inspection capability, each cache appliance 212, 219 is able to inspect the packet information in each of the TCP/IP stack layers to determine the physical port information for the sender and receiver from the L2 datalink layer, the logical port information for the sender and receiver from the L3 network layer, the TCP/UDP protocol connection information from the L4 transport layer, and the NSF/CIFS storage protocol information from the L5 session layer. In addition, the packet inspection capability enables each cache appliance to be spliced seamlessly into the network so that it is transparent to the L3 and L4 layers and only impacts the storage requests by processing them for the purposes of accelerating them, i.e., as a bump-in-the-wire. Rather than splicing all of the connection parameters in the L2, L3 and L4 layers, each cache appliance splices only the connection state, source sequence number and destination sequence number in the L4 layer. By leaving unchanged the source and destination MAC addresses in the L2 layer, the source and destination IP addresses in the L3 layer and the source and destination port numbers in the L4 layer, a client perceives that it is communicating with the filer, and vice versa, and there is no awareness at either the client or filer of any intervening cache appliance. With this approach, the spliced connections between clients and filers are separated to meet the data needs of the client from the cache, while providing periodic updates to meet the connection timeout protocol requirements of the filer. In selected embodiments, a read or write request is processed at the cache appliance by making only layer 1 and layer 2 configuration changes during installation or deployment, and as a result, no filer or client configuration changes are required in order to take advantage of the cache. With this capability, an installed cache appliance provides a fast and transparent storage caching solution which allows the same connections to be maintained between clients and filers. And if there is a failure at the cache appliance, the cache appliance automatically becomes a wire between the client and filer who are able to communication directly without any reconfiguration.

Figure 3:
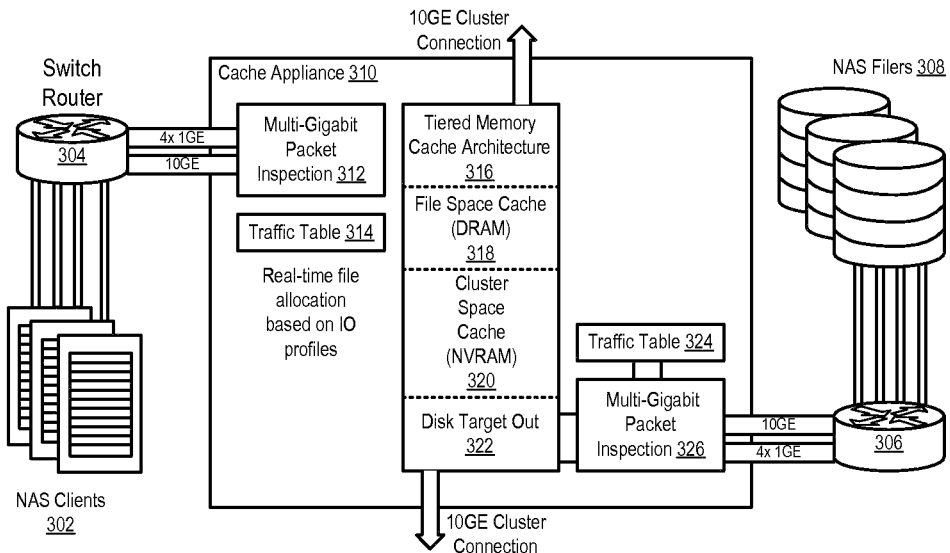
FIG. 3 depicts the functional operation of a non-disruptive storage cache appliance with packet inspection intelligence.

The functional operation of the packet inspection intelligence in the cache appliance may be described with reference to FIG. 3 which depicts the functional operation of a non-disruptive storage cache appliance 310 that is connected in-line between one or more NAS clients 302 and a switching router 304 (on the one hand) and one or more NAS filers 308 and a switching router 306. When a request to read or write application data is received from a storage client 302, the cache appliance 310 uses dedicated, high-speed packet inspection hardware 312 to inspect the packets of incoming requests to determine if they should be passed inward for further processing by the cache appliance 310 or forwarded to another destination, such as a NAS filer 308. For example, if the NAS client 302 requests application data that is stored on the cache appliance 310, the packet inspection hardware 312 may process the request by using an upstream traffic table 314 to perform real-time file allocation base on I/O profiles. If the packet inspection indicates that the request is to be processed by the cache appliance 310, the request is passed internally to the tiered memory cache system 316 which controls the cache storage into tiers. For example, tier 1 storage is reserved for the most critical data (including email, high transaction databases, business critical processes and line of business applications), while tier 0 storage refers to an in-band, network-resident, policy-driven, high-performance, scalable tier of memory subsystems that is used for the storage of business critical data under control of a policy engine that is managed independently from the one or more NAS filers. Within the tiered memory, a volatile or dynamic random access memory (DRAM) 318 provides a file space for caching application data, while a non-volatile random access memory (NVRAM) 320 provides a space for caching pending write operations to NAS filers for the purpose of maintaining data coherency in a failure event, such as network packets not arriving to their destination. If it is determined that the request can not be serviced by the cache appliance 310, the output module 322 outputs the client request the disk target in the destination NAS 308.

In similar fashion, when a response to a request to read or write application data is received from an NAS filer 308, the cache appliance 310 uses dedicated, high-speed packet inspection hardware 324 to inspect the packets of incoming responses to determine if they should be passed inward for further processing by the cache appliance 310 or forwarded to another destination. For example, if the NAS filer 308 returns application data in response to a read request, the packet inspection hardware 326 may process the response for possible caching at the cache appliance 310 by using a downstream traffic table 314 to perform real-time file allocation base on I/O profiles. If the packet inspection indicates that the request is to be processed by the cache appliance 310, the request is passed internally to the tiered memory cache system 316 which controls the cache storage into tiers.

Figure 4:
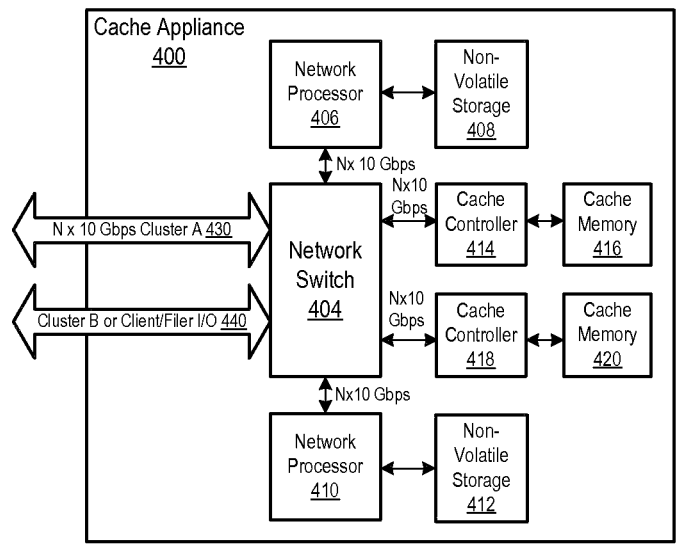
FIG. 4 is a block diagram of a cache appliance which may be used in connection with selected embodiments of the present invention.

As described herein, the cache appliance is the fundamental element of the data storage cache system, and is implemented as a combination of a high-speed packet processor and a large cache memory. While a variety of different architectures may be used to implement the cache appliance, FIG. 4 depicts in block diagram form an example hardware implementation of a cache appliance 400 which may be used in connection with selected embodiments of the present invention to provide network interfaces, packet processing and cache memory. To provide these functions, the cache appliance 400 includes a network switch interconnect component for routing network traffic, a network processor component for packet processing, and a cache controller and cache memory component for storing cached data files.

The central element of the cache appliance hardware 400 is a high-speed network switch 404. The network switch 404 provides client and filer interfaces, 10 Gbps cluster interfaces, and multiple 10 Gbps connections to the packet processing and cache controller hardware. The network switch 404 manages data flow between the I/O ports 430, 440 and the packet processing and cache controller hardware, and may be optimized for network traffic where it is desirable to obtain extremely low latency. The network switch 404 may be configured to concurrently accommodate a large number of independent accesses that are processed on each clock cycle, and enables communication data requests from network processor hardware to the cache hardware, as well as data responses from cache hardware to the network processor hardware. In one embodiment, network switch 404 includes logic (such as multiplexers or a switch fabric, for example) that allows any network processor to access any cache memory, and that conversely allows data to be returned from any cache memory to any network processor. Network switch 404 may also include logic to queue data requests and/or responses, such that requests and responses may not block other activity while waiting for service, and may be configured to arbitrate cache access conflicts.

The cache appliance hardware 400 also includes one or more network processor units (NPUs) which run the core software on the device to perform node management, cluster communication, packet processing, cache management, and client/filer communication. In a selected embodiment, two NPUs 406, 410 are provided, where each NPU may be implemented as a multi-threaded mufti-core processor. To assist with device operation, each NPU 406, 410 controls a durable or non-volatile cache memory 408, 412, respectively. With the non-volatile cache memory units 408, 412, a very large amount of durable memory (e.g., 128 Gigabyte) may be provided for caching device operation software or data, such as with a field replaceable solid state drive (SSD) or hard disk drive (HDD) memory.

Finally, the cache appliance hardware 400 includes a substantial cache memory for storing data files. To control the cache memory, the cache appliance hardware 400 includes a cache controller for each cache memory. In a selected embodiment, two cache controllers 414, 418 are provided, respectively for each volatile cache memory 416, 420. With the volatile cache memory units 416, 420, a substantial amount of dynamic random access memory (DRAM) (e.g., 64 Gigabyte) may be provided. Each cache controller 414, 418 is responsible for connecting both the dynamic cache memory and the non-volatile storage to the high-speed interconnect within the cache appliance. In addition, the cache controllers 414, 418 may offload some cache memory lookup and coherency functions from the network processors 406, 410.

To increase the caching capacity and performance of the data storage cache system, a cache appliance may be connected or clustered with one or more additional cache appliances on a private network so that the appliances work in tandem to form a single homogeneous caching device. As described above, each cache appliance 400 contains a set of network processing resources, dynamic storage, and non-volatile storage that are combined as a pool of resources which may be treated as a node on the network. To this end, each cache appliance 400 includes I/O ports 430, 440 that allow the cache appliance 400 to be connected to another cache appliance.

Figure 5:
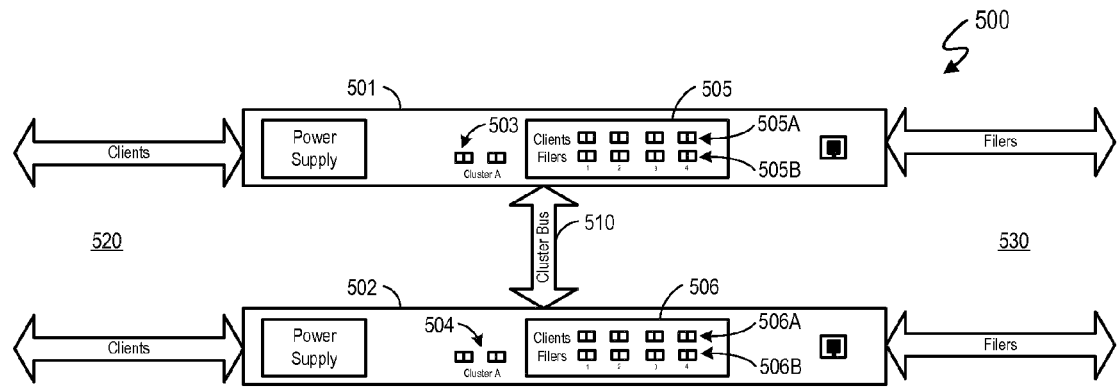
FIG. 5 depicts a first connection configuration for connecting up to three cache appliances in a daisy-chain topology.

In a first example connection configuration, a plurality of cache appliances (e.g., up to three appliances) may be physically connected in a point-to-point connection configuration using a pair of high-speed Ethernet ports. FIG. 5 depicts an example connection configuration for a two node cluster 500 in which two cache appliances 501, 502 are connected in a daisy-chain topology. As illustrated, the first cache appliance 501 has a first plurality of I/O ports 503 (e.g., two 10G Ethernet ports) and a second plurality of I/O ports 505 (e.g., eight 1G Ethernet ports). Likewise, the second cache appliance 502 has a first plurality of I/O ports 504 (e.g., two 10G Ethernet ports) and a second plurality of I/O ports 506 (e.g., eight 1G Ethernet ports). By directly connecting the first plurality of I/O ports, a cluster bus 510 is formed between the cache appliances 501, 502. In addition, the second plurality of I/O ports may be used to connect the cache appliances 501, 502 to the filers 530 and clients 520. Since the cluster 500 performs as a bump-in-the-wire to connect a particular filer 530 to a particular client 520, the second plurality of I/O ports 505, 506 on each appliance may be paired together. Thus, the second plurality of I/O ports 505 on the first appliance 501 includes client I/O ports 505A and corresponding filer I/O ports 505B. Likewise, the second plurality of I/O ports 506 on the second appliance 502 includes client I/O ports 506A and corresponding filer I/O ports 506B. With this arrangement, the cluster 500 may be installed in a network by breaking a pre-existing network segment in two and then connecting one side to the client I/O port (e.g., 505A) in the pair and the other side connected to the filer I/O port (e.g., 505B) in the pair.

Figure 6:
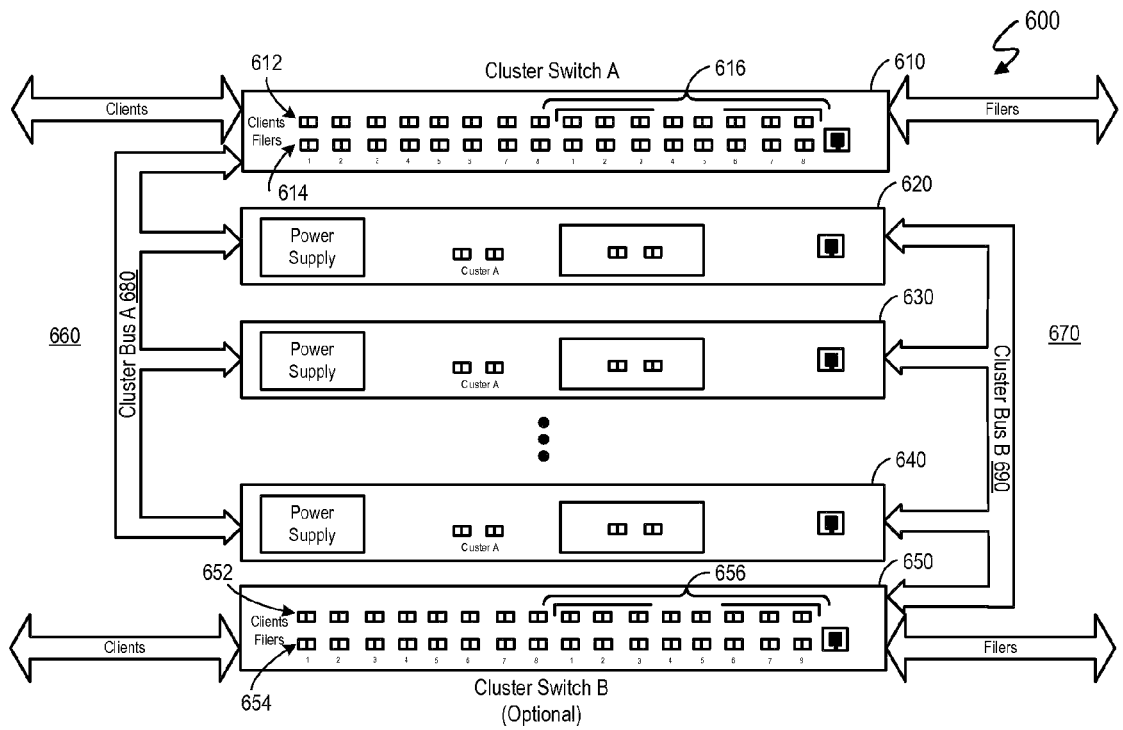
FIG. 6 depicts a second connection configuration for connecting a plurality of cache appliances in a star topology.

In another example connection configuration depicted in FIG. 6, a plurality of cache appliances 620, 630, 640 may be physically connected in a star topology configuration using one or more cluster switches 610, 650 to form a mufti-node cluster 600. As disclosed herein, the cluster switch 610 manages the connections to the clients 660 and filers 670 and also provides IPC connectivity between the cache appliances 620, 630, 640. By connecting a first cluster switch 610 to I/O ports on each of the cache appliances 620, 630, 640, a fully meshed network is formed between the cache appliance nodes 620, 630, 640 in the cluster 600. The cluster switch 610 may be connected to communicate with the clients 660 and filers 670 without any hardware limit on the number of cache appliances that can be connected, so any number of cache appliances can be connected up to the supported maximum. In the example configuration shown in FIG. 6, the cluster switch 610 at the top of the cluster 600 provides paired port connections between the clients 660 and filers 670 by including client I/O ports 612 and corresponding filer I/O ports 614. In addition, the cluster switch 610 provides I/O ports 616 (e.g., 10G ports) for connecting with the cache appliances 620, 630, 640 over a cluster bus 680. In this configuration, each of the cache appliances 620, 630, 640 is connected to the cluster switch 610 via a pair of point-to-point 10G Ethernet connections. These connections form the cluster bus 680 which is used to transport filer and client packets from the cluster switch 610 to the cache appliance/nodes, and to transport all intra-node operations and control traffic.

Figure 7:
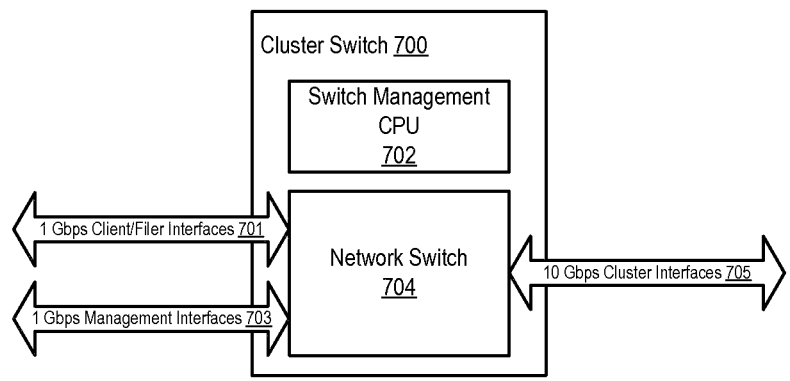
FIG. 7 is a block diagram of a cluster switch which may be used in connection with selected embodiments of the present invention.

While a variety of different architectures may be used to implement the cluster switch, FIG. 7 depicts in block diagram form an example hardware implementation of a cluster switch 700 which may be used to provide the point-to-point cluster interconnect between cache appliance nodes in connection with selected embodiments of the present invention. In support of these interconnections, the cluster switch 700 includes a switch management processing unit or controller 702 and a 10 Gbps network switch 704. The network switch 704 provides a first plurality of I/O interfaces 701 (e.g., multiple 1 Gbps interfaces) for client and filer connections, and also provides a second plurality of interfaces 705 (e.g., 10 Gbps interfaces) for cluster connections. The network switch 704 may also include a management interface 703. The cluster switch 700 also includes a switch management processing unit 702 which provides in-band switch management for managing the cluster switch 700 by serving as a master node in the cluster (e.g., cluster 600 shown in FIG. 6) to control load balancing, port assignment, and write cache redundancy.

As described thus far with reference to FIG. 6, a single cluster switch 610 may be used to connect a plurality of cache appliances into a cluster. However, in selected embodiments, an additional cluster switch 650 may also be used to cluster the cache appliances 620, 630, 640. As depicted, the optional cluster switch 650 at the bottom of the cluster 600 provides paired port connections between the clients 660 and filers 670 by including client I/O ports 652 and corresponding filer I/O ports 654. In addition, the cluster switch 650 provides I/O ports 656 (e.g., 10G ports) for connecting with the cache appliances 620, 630, 640 over a cluster bus 690. In this configuration, each of the cache appliances 620, 630, 640 is connected to the cluster switch 650 via a pair of point-to-point 10G Ethernet connections. These connections form the cluster bus 690 which is used to transport filer and client packets from the cluster switch 650 to the cache appliance/nodes, and to transport all intra-node operations and control traffic. When present, the second cluster switch 650 provides a redundant set of filer and client interfaces for high availability deployments, and also increases the performance of the entire cluster 600 by doubling the cluster bus bandwidth.

Figure 8:
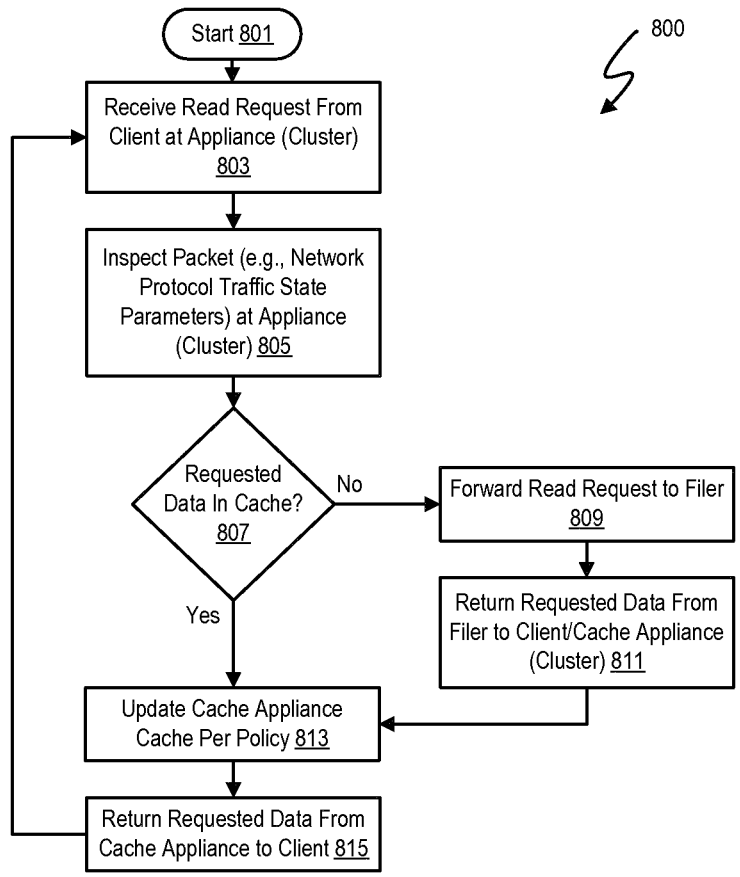
FIG. 8 depicts an example process flow sequence for caching storage data using spliced connections.

Turning now to FIG. 8, there is depicted an example process flow 800 for caching storage data at a cache appliance using spliced connections. The process starts (step 801), such as when a cache appliance is positioned between the storage clients and the NAS filers. In operation, the cache appliance operates to intercept all requests between the clients and filers and provide read and write cache acceleration by storing and recalling frequently used information. After receiving a read request from a client (step 803), the cache appliance (cluster) inspects the packet information associated with the request (step 805) to obtain information for moving the packet through the system (e.g., network protocol traffic state parameters). The inspected information is used to identify packets that need to be processed by the cache appliance, as well as packets that are to be forwarded by the cache appliance. By snooping network protocol traffic state parameters and splicing connections between filers and clients, the cache appliance provides Open System Interconnect (OSI) transparency, thereby performing in the Ethernet network as a bump-in-the-wire. Based on the inspected information, the cache appliance checks to see if the requested data is present within the appliance's cache memory. If so (affirmative outcome to decision 807), this is considered a read cache-hit and the request is satisfied directly from the appliance's cache memory (step 815) before or after updating the cache memory pursuant to the cache replacement policy (step 813). Otherwise, this is a read cache-miss (negative outcome to decision 807) and the cache appliance forwards the read request to the filer (step 809). The data returned by the filer may be sent to the client and/or cached in one or more cache blocks in the cache memory of the cache appliance (cluster) (step 811) so that the read request can be satisfied from the cache appliance (step 813). Either before or after the read request is returned to the client, the cache appliance (cluster) promotes the cache block based on the cache replacement algorithm (step 815). Any desired cache population algorithm for page replacement and cache eviction may be used to populate the cache memory in the cache appliance, including, for example, a least recently used (LRU) algorithm (e.g., LRU-K or LRU-2), a least frequently used (LFU), a least recently/frequently-used (LFRU) algorithm, an adaptive replacement cache (ARC) algorithm, a multiqueue (MQ) replacement algorithm, the 2Q algorithm which uses two queues to separate hot and cold items, a low inter-reference recency set (LIRS) algorithm.

Figure 9:
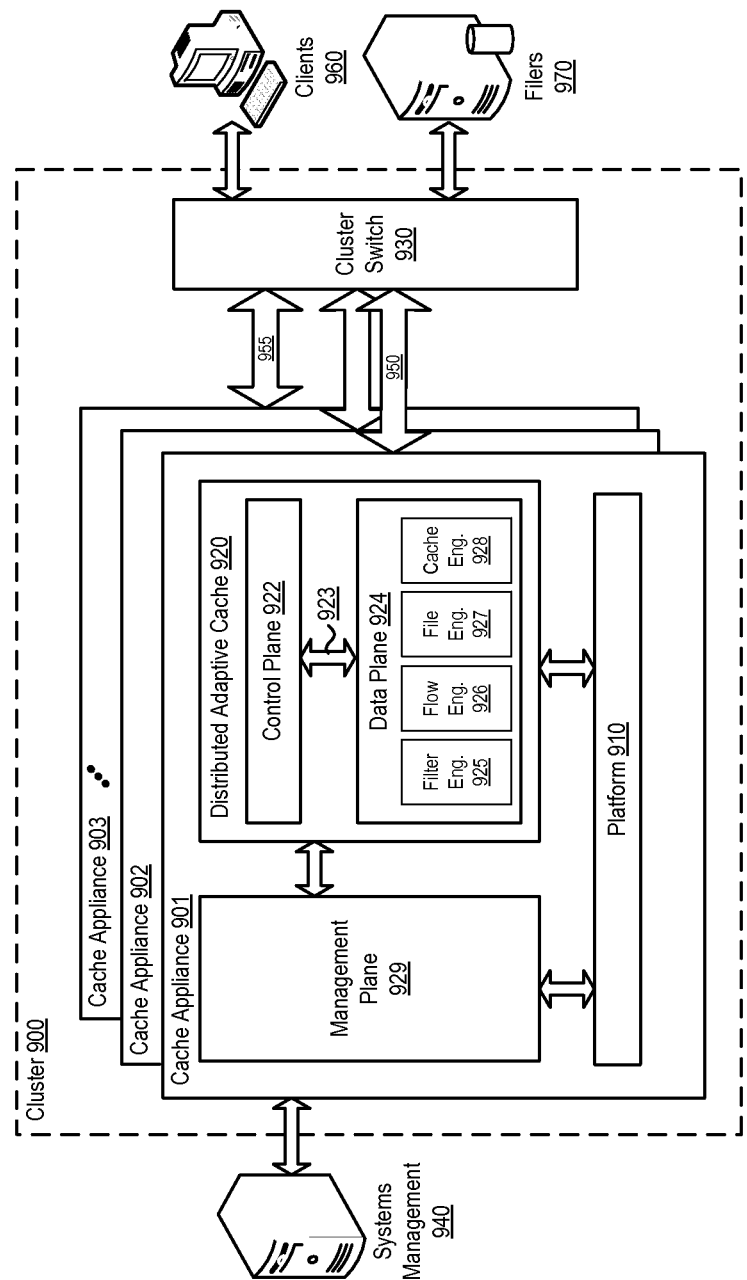
FIG. 9 depicts the overall system architecture of a non-disruptive storage cache appliance cluster.

To illustrate the constituent component functionality of the clustered cache appliances connected by a cluster switch, reference is made to FIG. 9 which depicts the overall system architecture of a non-disruptive storage cache appliance cluster. The depicted architecture is divided into four logical components, including the platform component 910, the distributed adaptive cache component(s) 920, the cluster switch component 930 and the systems management component 940.

The platform component 910 includes the hardware and system software components that come together to form the basis of the system. As described hereinabove, the hardware in the platform component 910 includes the individual cache appliance (described above with reference to FIG. 4) which provides network interfaces, packet processing, and cache memory. In addition, the hardware in the platform component 910 includes the cluster switch (described above with reference to FIG. 7) which provides high-speed point-to-point (star-topology) interconnect between cluster nodes for load balancing, write cache redundancy, and management. The software in the platform component 910 includes a boot loader component (for bringing the appliance to a minimal operating state), an operating system component (to provide for process scheduling, memory allocation, network, and flash file system facilities) and drivers (for extending the OS functionality and provide access to required hardware).

The distributed adaptive cache 920 distributes the caching responsibilities amongst the nodes in the cluster and dynamically adapts the caching behavior to its environment via a set of policies. The distributed adaptive cache component(s) 920 include the embedded software that runs on the cache appliances to implement the caching functionality amongst the nodes 901-903 of the cluster. By having each node in the cluster hosts a part of a distributed memory cache, servicing of the I/O requests is accelerated. When the distributed adaptive cache component 920 is architected as a shared-nothing system, every piece of file data within the cluster is found in one and only one memory location and the data is in no way replicated in the system. The distributed adaptive cache 920 locates its data using a consistent-hash algorithm which guarantees that the location of the data is unique and deterministic. The location of a block of data is mathematically computed at a fixed processing cost. The algorithm also makes the cluster minimally susceptible to cluster changes such as the addition or failure of a node, since only a part of the distributed adaptive cache is affected by a change in the cluster's configuration. The algorithm is said to be self-organizing in that the I/O load is seamlessly redistributed amongst the nodes after a change in the cluster topology.

As illustrated, the distributed adaptive cache component software 920 includes a data plane section 924 which performs the required packet processing functions on a packet so that each packet can progress through the cluster 900. In other words, if something must be performed to progress a packet through the system, then it is a data plane activity. The data plane 924 processes received client and filer traffic through a pipeline of operations. At any point during the processing, the data plane 924 may forward a packet out from the distributed adaptive cache component 920 because it is finished servicing the operation, or the packet is not pertinent to the system, or for other reasons. The data plane 924 may also use a cluster interface to forward the packet to another node in the cluster 900.

The distributed adaptive cache component software 920 also includes a control plane section 922 which performs the required processing functions about a packet to facilitate the data plane or that is not required in order to process a packet. In other words, the control plane section 922 stores control information that affects the data plane 924. If any stimulus outside of a packet traversing the system requires an operation, then it is a control plane activity. The control plane 922 is composed of stand-alone data structures as well as a set of managers that themselves may contain their own data structures. The interaction between the control plane 922 and the data plane 924 is via the interface 923 which can be take several forms, such as function calls, IPC requests, or direct access into a data structure's memory. As packets progress through the system, the data plane 924 queries the control plane 922 to help it perform its operations. The data plane 924 conversely sends information to the control plane 922 that it may either need in subsequent operations or that provide information to the management functions of the system. In addition, the distributed adaptive cache component software 920 includes a management plane section 929 which performs various ancillary functions on the system that do not affect the processing of packets or that is on demand from the remote management server 940.

The cluster switch component 930 includes the hardware and software that manages the connections to the clients 960 and filers 970, as well as providing IPC connectivity between the cache appliances 901-903. As illustrated above in FIG. 7, the cluster switch component 930 provides the point-to-point cluster interconnect between cache appliance nodes 901-903, provides one or more 10 Gbps interfaces for cluster connections, and provides one or more multiple 1 Gbps interfaces for client and filer connections, as well as an optional management interface.

Finally, the systems management component 940 is the software running on a remote management server that facilitates all fault, configuration, accounting, performance, and system tasks performed on the cluster. The systems management component 940 enables a user to define, configure and/or modify a cache policy for the cluster 900 to accelerate the performance of a cluster 900. In addition, the systems management component 940 enables the user to define a policy to accelerate the performance of particular line of business applications or business-critical processes. The configuration that specifies how to cache a particular application is the application cache profile. An application cache profile identifies the filesystem resources that are used by a particular business application, and also contains a priority that is intended as a hint for what should be evicted. The priority for an application is used to indicate that files of a lower priority application should be evicted in favor of caching higher priority application objects. The profile may also contain frequency caching hints, such as cache files that are accessed some number of times over a given period of time.

Application profiles can be applied to all clusters, some of the clusters, or specifically to a single cluster. Each application profile is defined as a set of expressions called policy statements. Each policy statement includes or excludes a set of filesystem resources from the application profile. The filesystem resources are specified using a resource path that consists of the following components: protocol, filer address, volume name, and path to a filesystem resource. The policy statement can be further qualified using file size, operation type, and frequency of access.

Once the application cache profiles have been defined, they can be scheduled with the systems management component 940 to specify the window of time where the application's policy statements will be valid. If an application is not scheduled, it is considered disabled. If two or more applications overlap, a priority can be assigned to control which application takes precedence.

In operation, the data plane 924 includes a packet filter engine 925 that inspects received packets to identify the packets that need to be processed by the cluster 900, and forwards all other packets to an exit interface 950, 955. This action minimizes the impact of non-relevant packets on system resources. There are two types of packets that must be identified for further processing: cluster IPC packets and client/filer packets. Cluster IPC packets are identified based on L2 headers and knowledge of how such packets are formatted (e.g., custom Ethernet types). Client/filer packets are identified based on L2-L4 headers and queries to the port map manager which contains information about the UDP/TCP ports being used by the filers to provide storage services (NFS, CIFS, etc.). The information gleaned from L2-L4 parsing is saved in the packet context to avoid having to parse these headers again in other components.

The data plane 924 also includes a flow engine 926 to process TCP connections and UDP conversations by providing a place to store flow context and to implement split TCP connections and flow serialization, where a flow refers to a sequence of TCP or UDP packets having with the same 5-tuple. The flow engine provides a mechanism for other modules to store flow-specific data for later retrieval. For example, the NFS module may store data related to an NFS request to match with an ensuing NFS reply. Another primary example is TCP connection state for tracking sequence numbers, retransmits, etc. As from implementing split TCP connections, this occurs when the cluster 900 becomes a man-in-the-middle on a connection when a request (e.g., an NFS read) is intercepted and served from local cache. The flow manager implements the logic needed to be a man-in-the-middle on a split connection.

A file engine 927 in the data plane 924 handles layer 5-7 NFS, mount, CIFS, HTTP, FTP, and port mapper transactions that are used to perform protocol decode, file lookup, and transaction processing operations. In addition, the file engine 927 may be used to implement the adaptive cache policy by handling storage-related packets that the cache policy identifies as being not cacheable, as well as cacheable storage-related packets that are not a read/write request/reply. In protocol decode operations, the protocol messages are delineated and decoded based on a protocol content type that is determined by the flow engine. After decode, a file lookup operation is performed using a reverse lookup of the internal file record based on filer and a protocol-specific file reference. This provides the file-specific information needed to process the message (e.g., internal file handle, cache policy, etc). In transaction processing operations, the requests are tracked and correlated with corresponding responses as part of a transaction pair between a client request and filer response, and based on the transaction type, the completed transaction pairs are routed to the appropriate component for further processing. For example, client requests for cacheable objects are intercepted and passed to the appropriate component (data requests to the cache engine), and all the information necessary to complete the transaction is passed on (packet, packet context, file record, request, etc.).

Finally, the data plane 924 includes a cache engine 928 that provides fault-tolerant block-level file caching. In addition, the cache engine 928 may be used to implement the adaptive cache policy by handling cacheable storage-related packets that are a read/write request/reply. File requests are translated into distributed cache block accesses. A cache block is a unit of memory that is dedicated to storing file data. The blocks reside within the distributed memory that is implemented on top of the cluster of nodes 901-903. Even though NAS protocols are file-based, cache management may be simplified by superimposing a block approach. The cache engine 928 hides the distributed nature of the cache, providing file-based I/O to the control plane 922.

By clustering cache appliances together, the size of the cache memory for a filer system may be scaled and data content may be distributed across multiple cache appliances without user intervention or service interruption. In addition, the packet inspection capability enables connection splicing so that the cache appliance (cluster) can be inserted between filers and filer's clients or users without having to change mount points and network addresses, implementation data migration and network topology. In particular, the cache appliance may be installed in the physical path (along with one more network switches) by momentarily interrupting the logical network connection between filers and its clients. Once the cache appliance (cluster) is installed, it commences operation by identifying active network connections traveling along the physical path between the filers and filer's client(s). By transparently inserting the cache appliance cluster between filers and filer's clients using spliced connections, the size of the storage cache may be scaled by distributing data content across multiple cache appliances without user intervention or service interruption, and without having to change mount points and network addresses, implementation data migration and network topology.

As described herein, the caching policies will control what data is stored on the cache appliance cluster, and thereby obtain high-performance storage benefits. To the extent that the cache appliance cluster is a precious, finite resource, the cache policies control how the resource is used and who has access to it. In selected embodiments, an initial or default cache population algorithm may be adaptively adjusted or modified based on policies generated based on the analysis of behavioral use and network adaptation. Such modifications occur automatically upon discovery of adjacent storage and networking equipment, learned traffic patterns and/or identified data usage. In addition or in the alternative, the modifications to the cache population algorithm can be managed, optimized and automated by the user based on analysis of transaction patterns between clients and filers and/or based on network utilization.

The use of adaptive cache policies to modify or adjust the caching behavior of the cache appliance cluster can be especially helpful when the data storage needs vary based on application needs and/or chronological considerations. For example, some client applications which use the filer storage are more important to business success than others, such as when some clients and users generate more revenue than other clients. To support the important clients, the cache appliance cluster may be configured to identify the important clients based on the extracted packet information, and provide preferential cache access to the important clients. In addition, application workloads may vary over time, such as when the activity for some applications peaks at different times of the day or different days of the week, or when distinctive files in the application's data set may be hot at different times. Based on the detected or known behavioral patterns, the caching policy of the cache appliance cluster may be adjusted to enable users to differentiate each of these scenarios and automate the management of the caching resources. Thus, the cache policy may provide that cache access priority changes over time, so that the applications from a first client at a first predetermined time period will have cache access priority, while the applications from a second client at a second predetermined time period will have cache access priority. As will be appreciated, the cache policy may be adjusted to select cacheable information using a variety of techniques, such as pattern searches and content matching.

To understand how an adaptive cache policy may be used to selectively populate the cache appliance cluster with data files, a description is now provided with reference to an example cache appliance cluster which is configured or programmed with a default page replacement algorithm and an adaptive cache policy. The adaptive cache policy effectively complements the default page replacement algorithm to specify which applications are to be given priority access for storage on the cache appliance cluster by applying one or more prioritization rules. In operation, the cache appliance cluster may view every storage operation as an opportunity to cache, and may apply the default page replacement algorithm to cache the most frequently used pages. In selected embodiments where the default caching scheme is implemented as a Least Recently Used with Dual Time reference (LRU-2) algorithm eviction policy aided with Greedy Dual Size Frequency (GDSF) algorithm, storage access is accelerated across the board because the cache engine performs continuous LRU-2 analysis for page replacement and cache eviction.

The ability to modify or adapt the default page replacement/cache eviction algorithm is provided with user-defined cache policies which control or influence how a cache appliance cluster caches an application data set, which is the set of data files that an application reads or writes. When there are clients accessing an application's data set that are not serving the application's business interests (such as clients performing archiving or file search operations), it may be advantageous to exclude such clients from accessing the cache appliance cluster. To this end, an application may be defined as a related or identified group of clients that access a particular data set. At any given time, there is a working set of pages from the application data set that are being read or written, where a page is a logical block of file data that may be cached. Finally, the application's critical working set refers to the set of pages that is frequently being read or written by an application. To the extent that I/O bottlenecks are created when an application is waiting to complete reads and writes on the critical working set, access to the critical working set can be accelerated by caching the application's critical working set in the cache appliance cluster. While traditional cache page replacement algorithms are designed to serve the most active pages from cache, they are not sufficient to ensure effective use of the cache if the total application working sets are much larger than memory and application storage access patterns vary randomly. Another drawback with traditional page replacement algorithms is that they do not take into account the business interests of the data storage network. Accordingly, selected embodiments of the present invention use adaptive caching policies to complement page replacement algorithms by identifying which application data sets are to be stored in the cache appliance cluster, such as by selecting application data sets that are most important to the business, or by selecting application data sets on the basis of when they should be cached. With an adaptive cache policy, cache resources may be intelligently managed and optimized by placing data files into the cache memory based on business needs so that critical applications that are important to business success are given preferential cache access, even though other files may have been accessed more recently, more often, or used by more clients.

In accordance with selected embodiments of the present invention, an adaptive cache policy is implemented when a user (such as a systems expert) identifies an application data set and/or critical working set, and then creates one or more policies to automate the cache management of those data sets in order to control or influence what files are cached and/or when caching occurs. An adaptive cache policy may be expressed as an application profile which allows a user to identified the application's critical working set in terms of a set of files that, when served from cache, will increase the overall performance of the application by reducing or eliminating I/O bottlenecks. The identified files may be described with reference to the file path components, such as NAS subsystem, filer, volume, path, directory, name, extension and size. Any of the components may be wild-carded using simple globing syntax.

The application profile may also prioritize each application according to its business importance. As a result, application data sets with higher priority are given preference compared to lower priority application data sets.

In yet another feature, each application profile may define a schedule for when an application's critical working set is to be cached. For example, if a particular client performs payload computations on a particular time or on a particular schedule, the application profile will specify that the client is to be given preferential cache access at that time or schedule.

In yet another embodiment, the application profile may be used to identify specific clients who are to be given preferential cache access. For example, the profile may identify priority application clients by their IP address so that, when a priority client requests files from an associated data set, they are to be considered for caching. Conversely, when a non-priority application client requests the same resources, that request is served by the filer if it is not in cache.

The application profile may also be used to specify whether write-back or write-through caching is enabled for the application. In write-back mode, asynchronous write requests are logged to local stable storage (e.g., non-volatile cache memory) in the cache appliance cluster, and a response is sent to the client before the data in the cache appliance cluster is copied to the filer. In write-through mode, write requests are synchronous and a response is not sent until the filer has acknowledged the write.

Figure 10:
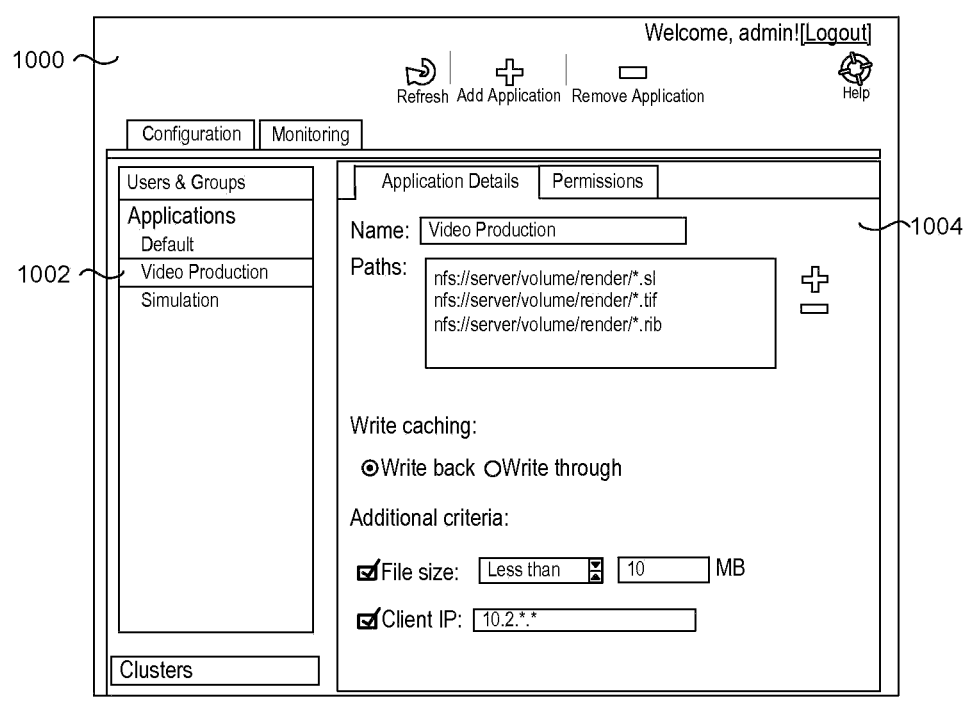
FIG. 10 depicts an example cache policy configuration window for configuring an application profile.

As will be appreciated, the application profile for an application may define an adaptive cache policy using one or more of the above-described prioritization rules, and may be enabled or disabled separately from other application profiles. For example, FIG. 10 depicts an example cache policy configuration window that would be used by a user (e.g., system administrator or expert) to configure an application profile defined as Video Production (shown in the applications section 1002). In the configured profile shown in window 1000, the application details section 1004 shows that the cache appliance cluster is instructed to cache all read operations and perform write-back caching on all files that are less than 10 MB in size and have the suffix .sl, .tif, and .rib in the render directory of a specified NFS server and volume, and only cache those files when accessed by hosts on the 10.2.0.0 network. This policy would be in effect all of the time.

As indicated above, cache policies may be adaptively applied in time so that a cache preference is restricted to a particular period of time. For example, if a payroll application runs on Thursday evenings, the profile for that application could have an associated schedule which is used to instruct the cache appliance cluster to cache the payroll application's working set when its application clients access it, but only during the scheduled times when those clients are expected to be processing payroll.

Figure 11:
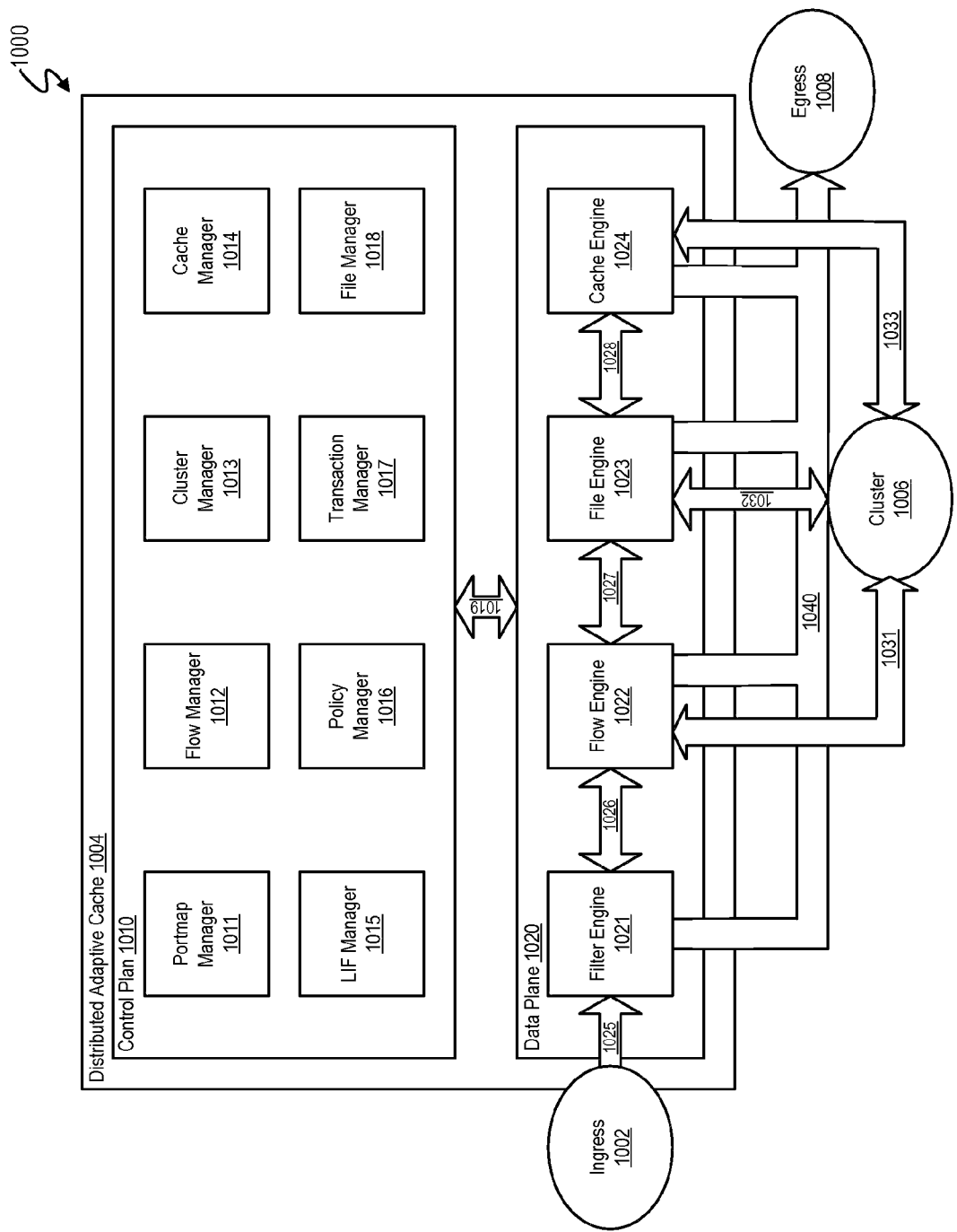
FIG. 11 illustrates how the control plane and data plane interact to process an incoming data request.

To demonstrate the operation of the distributed adaptive cache in a cache appliance cluster, reference is now made to FIG. 11 which illustrates how the control plane 1110 and data plane 1120 in a distributed adaptive cache 1104 interact to process read and write requests in incoming packets in accordance with selected embodiments of the present invention. As explained more fully below, the data plane 1120 takes in client and filer traffic via the ingress interface 1102 and progresses it through a pipeline of one or more operations performed by the engines 1121-1124 in the data plane 1120 which interact with the managers 1111-1118 in the control plane 1110. At any point during the processing, the data plane 1120 may forward a packet out through the egress interface 1108 because it is finished servicing the operation, or the packet is not pertinent to the system, or for other reasons. The data plane 1120 may also use the cluster interface 1106 to forward the packet to another node in the cluster.

When a client/filer packet is first received by the distributed adaptive cache 1104 at the ingress 1102, the packet is forwarded to the filter engine 1121 over the interface 1125. The filter engine 1121 parses and extracts the L2-L4 fields in the packet to compute a packet context. The filter engine 1121 also verifies the packet by computing the IP checksum so that any invalid packet can be dropped. If the received packet is not a TCP/IP or UDP/IP packet, the filter engine 1121 forwards the packet over the interface 1140 to the egress 1108. However, if a TCP/IP or UDP/IP packet is received, the filter engine 1121 obtains the source interface for the packet from the local interface (LIF) manager 1115 which uses a set of physical interfaces belonging to a logical interface to perform link aggregation, port bonding and fail-over, thereby insulating other parts of the system from these L2 details. The LIF manager 1115 provides APIs for the management plane to create and configure logical interfaces, and also provides APIs for the data plane to determine which logical interface a particular packet arrived on. The filter engine 1121 then uses the source interface to pass the packet and context over the interface 1126 to the flow engine 1122.

At the flow engine 1122, any IP fragment packets are queued until the last fragment is received. The flow engine 1122 also verifies the packet by computing the TCP or UDP checksums so that any invalid packet can be dropped. The flow engine 1122 also looks up the TCP/UDP port in the port map manager 1111 which contains information about the UDP/TCP ports being used by the filers to provide storage services, such as by maintaining a table that maps IP addresses and a UDP/TCP port numbers to a service such as NFS, MOUNT and HTTP. If the received packet is not a TCP/UDP port is not for storage service, the flow engine 1122 forwards the packet over the interface 1140 to the egress 1108. However, if the TCP/UDP port is for storage service, the flow engine 1122 uses the packet 5-tuple to look up the flow record from the flow manager 1112 which stores a flow table indexed by 5-tuples that allows clients to store and retrieve flow-specific data. The flow manager 1112 may also provide a flow balancing service (to spread flows across the cluster's processing elements) and flow serialization (to ensure that each flow is handled by a single processing element). If the flow for the received packet belongs to another node in the cluster, then the flow engine 1122 forwards the packet and context to the flow engine on that node via the interface 1131 and cluster interface 1106. The flow engine 1122 also re-sequences any out-of-order packets, updates sequence numbers and stores the updated sequence number in the context before passing the packet and context over the interface 1127 to the file engine 1123.

At the file engine 1123, upstream packets (e.g., from client to filer) are parsed to extract the L5-L7 fields from the packet and store them in the context. If the file engine 1123 determines that an incomplete L7 packet is received, the packet is sent to a reassembly queue. If the received packet is a storage control plane (mount, portmap, etc.), the file engine 1123 forwards the packet and context to the file manager 1118 which maintains file meta-data—such as a name space tree (similar to a dentry tree), individual file records (analogous to inodes), and reverse lookup tables—and correlates file references to ensure cache coherency. Any response packets detected at the file engine 1123 may be dropped, and any read or write requests are stored in the transaction manager 1117 where they are correlated with filer responses for purposes of populating the cache when a read miss occurs (by generating a filer request/reply), cleaning a dirty cache block when a outstanding write acknowledgment comes back from the filer and updating internal file records when file management requests are answered by the filer. By calculating an internal file handle (IFH), the file engine 1123 can retrieve a file record from the file manager 1118. The file engine 1123 also checks to see if the read or write request is allowed by querying the policy manager 1116 which provides a unified interface for querying cache policies and resolving conflicts between multiple policies. If the packet contains a file management request, the file engine 1123 constructs an answer from any available file record information and forwards the answer over the interface 1140 to the egress 1108. File management requests that cannot be answered from the file record are forwarded over the interface 1140 to the egress 1108. Finally, if the packet contains a read or write request, the file engine 1123 forwards the request to the cache engine 1124.

Downstream packets (e.g., from filer to the client) are processed differently by the file engine 1123, though some of the processing is the same. First, the downstream packets are parsed to extract the L5-L7 fields which are stored in the context. Incomplete L7 packets are sent to a reassembly queue. If the received packet is a storage control plane (mount, portmap, etc.), the file engine 1123 forwards the packet and context to the file manager 1118. Any request packets from the filer detected at the file engine 1123 may be dropped, and the transaction manager 1117 may be used to look up a corresponding request. If a corresponding request is found, the file engine 1123 updates the packet context, but otherwise drops the packet. If the packet contains a file management reply from the filer, the file engine 1123 updates the file record in the file manager 1118. However, if the packet contains a read/write reply from the filer, the packet is forwarded to the cache engine 1124. Any other packets are forwarded over the interface 1140 to the egress 1108.

A packet that makes it to the cache engine 1124 is a read/write request from a client or a read/write response from a filer. For any read request received from a client, the cache engine 1124 receives the packet and context over the interface 1128. Using the internal file handle, offset and length contained in context, the cache engine 1124 determines the list of data blocks for the read request. The cache engine 1124 then queries the cache manager 1114 to determine if the requested data is located within the cluster's cache. Each instance of the cache manager 1114 is responsible for receiving and processing cache requests (converted from NAS file requests) for locally cached data. The cache manager 1114 organizes the RAM-assigned to the data cache—into a collection of data blocks of equal size that are used to store and manage file data. In addition to storing data in cache blocks, the cache manager 1114 may also recycle cache blocks using the LRU-2 algorithm whenever its data cache is over-committed (i.e., the cache is 100% full when a cache-miss occurs). Upon receiving a read request, the cache manager 1114 checks to see if the requested data is present within the cache. If so, this is considered a read cache-hit, and the cache engine 1124 then fetches the data blocks from the cache memory platform. Otherwise, this is a read cache-miss, and the cache manager 1114 sends a read request back to the cache engine 1124 so that it can be forwarded to the filer. The returned data is cached in one or more cache blocks, and the read request is then satisfied from the cache. Finally, the cache block is promoted based on the LRU-2 algorithm. In forwarding a request to the filer, the cache manager 1114 may modify it so that the returned data (from the filer) fills an entire cache block. Finally, the cache engine 1124 formulates one or more response packets to the read request, and sends the requested read data in a response to the client. However, if a client's request is for data that is not in the cache appliance cluster 1100 (a read miss), the cache engine 1124 sends a request to the filer for any missing data blocks, and then awaits a response from the filer. As indicated above, this response from the filer is received from the file engine 1123, and includes a context from which the cache engine 1124 determines the list of data blocks. This information is used by the cache engine 1124 to store the missing data blocks in the cache, and to formulate one or more response packets that are send to the client.

For a write request from a client to write data to the cache appliance cluster 1100, the cache engine 1124 receives the packet and context from the file engine 1123 over the interface 1128. Using the internal file handle, offset and length contained in context, the cache engine 1124 determines the list of data blocks for the write request, and then stores the data blocks to the cache memory platform, at which point they are marked as "dirty." The cache engine 1124 then commits a write request to the cache manager 1124 which includes a journal which is a fault-tolerant transaction log of the application's write operations that is used exclusively for failure recovery. The cache manager 1124 uses the journal to record write requests in a persistent-store. The store behaves as a transaction log where write requests are began, canceled, and completed. The transactions are stored in a fault-tolerant way such that it requires the failure of three nodes before the data is lost. Upon receiving a write request, the cache manager 1124 checks to see if the requested data is present within the cache. If so, then the cache manager 1124 updates the local cache block with the new data. The cache block is also promoted. Next, the data is submitted to the journal so that it can be written to the cluster. Finally, the request is acknowledged as having been completed. Once the requested write operation is completed, the cache engine 1124 formulates and sends one or more response packets to the client, and then sends write requests for the dirty blocks to filer in order to initiate flushing of dirty cache blocks.

When a filer responds to a write request with a write reply, the cache engine 1124 receives the packet and context from the file engine 1123 over the interface 1128. Using the internal file handle, offset and length contained in context, the cache engine 1124 determines the list of data blocks for the write reply, marks the cached data blocks as "clean" and commits a write request to the journal in the cache manager 1124.

To coordinate and manage the individual cache appliance nodes within the cluster 1100, the control plane includes a cluster manager 1113 which is responsible for managing node membership and fail-over processing in the cluster 1100. Node membership management involves detecting and handling the movement of nodes in and out of the cluster 1100, and also responds to individual node failures. The cluster manager 1113 notifies registered clients of cluster membership events (e.g., by providing a notification whenever the cluster has been reconfigured). In addition, the cluster manager 1113 provides query services to specify the identity of the cluster, the cluster count, and the ID of each member of the cluster. The cluster manager 1113 may also be responsible for mapping of the data within the distributed adaptive cache to specify on which node a particular cache block resides. In other words, it provides a location service for the data.

By now it should be appreciated that there has been provided a method and system for adaptively caching data operations in a standalone cache unit that are requested from one or more networked data storage devices by one or more remote clients. As disclosed, the standalone cache unit includes a cache memory for caching data that is requested by a remote client. In addition, the standalone cache unit also includes a packet processor for transparently splicing connections between the data storage devices and remote clients, where the packet processor inspects network protocol traffic state parameters in NFS and CIFS traffic between remote clients and NAS subsystems received on the I/O ports to determine if a request from a remote client can be serviced by the standalone cache unit. The standalone unit also includes an adaptive cache control module to control caching operations in the cache memory by using a default cache engine policy (e.g., an LRU-2 algorithm aided with GDSF algorithm) and a user-specified cache profile to selectively adjust the default cache engine policy in accordance with business requirements of the user. In selected embodiments, the business requirements require preferential cache access for files from a user-specified application data set; or for files from a user-specified application data set in accordance with a predetermined schedule; or for files from a client located at a predetermined IP address; or for files from a predetermined location in a specified networked data storage device; or for a predetermined set of files that are identified by one or more file path components, such as NAS subsystem, filer, volume, path, directory, name, extension and size. In selected embodiments, the standalone cache unit may be implemented as a single cache appliance, or as a cluster of two or more cache appliances for caching data operations. In the cluster configuration, an appliance cache memory is included at each cache appliance for caching data that is requested by a remote client. In addition, an appliance packet processor is also included at each cache appliance for transparently splicing connections between the data storage devices and remote clients, where the appliance packet processor inspects network protocol traffic state parameters received on the I/O ports to determine if a request from a remote client can be serviced by the cluster. Finally, a connection interface is included at each appliance for connecting cache appliances over a cluster bus in a private network to form a cohesive memory pool from the appliance cache memories in the two or more cache appliances.

In another form, there is provided a method and system for adaptively caching storage requests in a cache appliance cluster using behavioral adaptive policies. As disclosed, a network cache appliance is provided for accelerating read and write requests from one or more storage clients for one or more files residing at one or more networked storage devices. The network cache appliance includes a tiered memory cache system for adaptively caching data to provide low-latency access in responding to read and write requests using dynamically adjustable cache policies that reflect the data caching requirements that change over time. In selected embodiments, the tiered memory cache system is implemented as a dynamic and non-volatile cache memory for providing low-latency access in responding to read and write requests, and an adaptive cache controller for controlling caching operations in the cache memory which uses a default cache engine policy and a user-specified cache profile for selectively adjusting the default cache engine policy in accordance with business requirements of the user. The network cache appliance also includes a packet inspection module for transparently inspecting a read or write request sent using an IP-based network protocol to determine if the request should be passed to the tiered memory cache system or forwarded to a networked storage device for further processing. In selected embodiments, the user-specified cache profile provides preferential access to the cache memory for files from a user-specified application data set in accordance with a predetermined schedule, though other criteria may be used to determine preferential access to the cache memory.

As will be appreciated by one skilled in the art, the present invention may be embodied in whole or in part as a method, system, or computer program product. For example, a computer-usable medium embodying computer program code may be used, where the computer program code comprises computer executable instructions configured to provide non-disruptive, adaptive storage caching using clustered cache appliances with packet inspection intelligence. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. An apparatus, comprising:
    a tiered memory cache system to adaptively cache data at a standalone cache appliance to provide low-latency access in response to read and write requests using adaptive caching polices to automatically select one or more application data sets based on one or more conditions; and
    a packet inspect module to inspect a read or write request sent using an Internet Protocol-based network protocol to determine when the request should be passed to the tiered memory cache system.

2. The apparatus of claim 1, further comprising:
    an adaptive cache controller, at the standalone cache, to execute computer-executable instructions in order to perform a data operation corresponding to the request and to automatically control caching operations in the tiered memory cache system using the adaptive caching polices.

3. The apparatus of claim 1, wherein the one more conditions comprise preferential access to the tiered memory cache system for files from a user-specified application data set in accordance with a predetermined schedule.

4. The apparatus of claim 1, wherein the one more conditions comprise preferential access to the tiered memory cache system for files from a predetermined location in a specified networked data storage device as compared to files from another location.

5. The apparatus of claim 1, wherein the one more conditions comprise preferential access to the tiered memory cache system for files from a first client located at a predetermined Internet Protocol address as compared to a second client located at a different Internet Protocol address.

6. The apparatus of claim 1, wherein the tiered memory cache system comprises a first tier storage and a second tier storage, the first tier storage comprises one or more of emails, high transaction databases, business critical processes and line of business applications.

7. The apparatus of claim 1, wherein the tiered memory cache system comprises a first tier storage and a second tier storage, the second tier storage comprises a scalable tier of memory subsystems that is used for storage of business critical data.

8. The apparatus of claim 1, wherein the tiered memory cache system comprises:
    a dynamic random access memory to provide a file space for caching application data; and
    a non-volatile random access memory to provide a space for caching pending write operations to Network Attached Storage filers to maintain data coherency during a failure event.

9. A method for accelerating read and write requests, the method comprising:
    receiving, at a standalone cache appliance, a read or write request from a remote client to perform a specified data operation at one or more networked data storage devices;
    determining when the request can be serviced by a tiered cache memory system located at the standalone cache appliance;
    performing the specified data operation at the tiered cache memory system; and
    automatically controlling adaptive caching operations in the tiered cache memory system using adaptive caching polices to select one or more application data sets based on one or more conditions.

10. The method of claim 9, further comprising:
    processing the request, at the standalone cache appliance, using an upstream traffic table to perform real-time file allocation based on input/output profiles.

11. The method of claim 9, further comprising:
    inspecting packet parameters in each TCP/IP stack layer associated with the request to determine when the request should be passed inward to the tiered memory cache system for further processing or forwarded to another destination.

12. The method of claim 9, wherein the one or more conditions comprise preferential access to the tiered memory cache system for files from a user-specified application data set in accordance with a predetermined schedule.

13. The method of claim 9, further comprising:
    determining when the request should be processed in a first tier storage of the tiered memory cache system, wherein the first tier storage comprises one or more of critical emails, high transaction databases, business critical processes and line of business applications.

14. The method of claim 9, further comprising:
    determining when the request should be processed in a second tier storage of the tiered memory cache system, wherein the second tier storage includes a scalable tier of memory subsystems that is used for storage of business critical data.

15. A non-transitory computer-readable medium having stored thereon instructions for performing a method of accelerating read and write requests comprising machine executable code which when executed by at least one machine, causes the machine to:
    receive, at a standalone cache appliance, a read or write request from a remote client to perform a specified data operation at one or more networked data storage devices;
    determine that the request can be serviced by a tiered cache memory system located at the standalone cache appliance;
    perform the specified data operation at the tiered cache memory system; and automatically control adaptive caching operations in the tiered cache memory system using adaptive caching polices to select one or more application data sets based on one or more conditions.

16. The non-transitory computer-readable medium of claim 15, further comprising machine executable code which when executed by at least one machine, causes the machine to:
   process the request using an upstream traffic table to perform real-time file allocation based on input/output profiles.

17. The non-transitory computer-readable medium of claim 15, further comprising machine executable code which when executed by at least one machine, causes the machine to:
   determine when data associated with the request is located in a first tier storage of the tiered memory cache system, wherein the first tier storage comprises one or more of critical emails, high transaction databases, business critical processes and line of business applications.

18. The non-transitory computer-readable medium of claim 15, further comprising machine executable code which when executed by at least one machine, causes the machine to:
   determine when data associated with the request is located in a second tier of the tiered memory cache system, wherein the second tier includes a scalable tier of memory subsystems that is used for storage of business critical data.

19. The non-transitory computer-readable medium of claim 15, wherein the one or more conditions comprise preferential access to the tiered memory cache system for files from a predetermined location in a specified networked data storage device as compared to files from another location.

20. The non-transitory computer-readable medium of claim 15, wherein the one or more conditions comprise preferential access to the tiered memory cache system for files from a user-specified application data set in accordance with a predetermined schedule.

* * * * *